US011919003B2

(12) United States Patent
Wang et al.

(10) Patent No.: US 11,919,003 B2
(45) Date of Patent: Mar. 5, 2024

(54) LOSS-FREE LIQUIDS MANIPULATION PLATFORM

(71) Applicant: THE UNIVERSITY OF HONG KONG, Hong Kong (HK)

(72) Inventors: Liqiu Wang, Hong Kong (HK); Wei Li, Hong Kong (HK); Xin Tang, Hong Kong (HK)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 145 days.

(21) Appl. No.: 17/577,472

(22) Filed: Jan. 18, 2022

(65) Prior Publication Data

US 2022/0234045 A1 Jul. 28, 2022

Related U.S. Application Data

(60) Provisional application No. 63/140,304, filed on Jan. 22, 2021.

(51) Int. Cl.

| | |
|---|---|
| ***B01L 3/00*** | (2006.01) |
| ***C12M 3/06*** | (2006.01) |
| ***G01N 35/00*** | (2006.01) |
| ***G03F 7/00*** | (2006.01) |
| ***G03F 7/038*** | (2006.01) |
| ***G03F 7/20*** | (2006.01) |
| ***G03F 7/32*** | (2006.01) |
| ***G06N 3/08*** | (2023.01) |

(Continued)

(52) U.S. Cl.

CPC ..... *B01L 3/502784* (2013.01); *B01L 3/50273* (2013.01); *B01L 2300/0887* (2013.01); *B01L 2300/0896* (2013.01); *B01L 2300/12* (2013.01); *B01L 2300/165* (2013.01); *B01L 2300/168* (2013.01); *B01L 2400/022* (2013.01); *B01L 2400/0415* (2013.01)

(58) Field of Classification Search

CPC ........... B01L 3/502784; B01L 3/50273; B01L 2300/0887; B01L 2300/0896; B01L 2300/12; B01L 2300/165; B01L 2300/168; B01L 2400/022; B01L 2400/0415; B01L 3/502707; B01L 2300/166; B01L 2400/0424; B01L 2400/0427; B01L 3/502792

See application file for complete search history.

(56) References Cited

U.S. PATENT DOCUMENTS

2018/0207640 A1* 7/2018 Hayden ............. B01L 3/502707
2021/0149184 A1* 5/2021 Zhitomirsky ....... H01L 27/1214

OTHER PUBLICATIONS

Meng, Dongli, et al. "The enhanced photothermal effect of graphene/conjugated polymer composites: photoinduced energy transfer and applications in photocontrolled switches." Chemical Communications 50.92 (2014): 14345-14348. (Year: 2014).*

(Continued)

*Primary Examiner* — Jennifer Wecker
*Assistant Examiner* — Oyeleye Alexander Alabi
(74) *Attorney, Agent, or Firm* — Amin, Turocy & Watson, LLP

(57) ABSTRACT

Disclosed is a device for moving a liquid in a substantially loss-free operation, the device made of at least a photothermal film; a pyroelectric crystal over the photothermal film; and a superomniphobic surface over the pyroelectric crystal, wherein the device is configured to move the liquid in the substantially loss-free operation with a beam of light.

15 Claims, 7 Drawing Sheets

(51) Int. Cl.
*G06N 20/00* (2019.01)
*H01F 1/053* (2006.01)
*H01F 7/02* (2006.01)

(56) References Cited

OTHER PUBLICATIONS

Tang, Xin, and Liqiu Wang. "Loss-free photo-manipulation of droplets by pyroelectro-trapping on superhydrophobic surfaces." ACS nano 12.9 (2018): 8994-9004. (Year: 2018).*

* cited by examiner

LOSS-FREE LIQUIDS MANIPULATION PLATFORM

CROSS-REFERENCE TO RELATED APPLICATIONS

This application claims priority to U.S. Provisional Application Ser. No. 63/140,304 filed on Jan. 22, 2021, the entire contents of which are incorporated herein by reference.

TECHNICAL FIELD

Disclosed are devices and apparatuses for moving a liquid in a substantially loss-free operation, as well as methods of transporting a liquid in a substantially loss-free manner.

BACKGROUND

Manipulating buffers and organic solvents on surfaces is fundamental for many biological and/or chemical operations and thus critical in various thermal, optical, and medical applications. For any of these, it is necessary to design a platform that enables locally addressable fluids to be navigated with a low loss rate and partitioned and merged in a readily controlled manner. Light outperforms the others, mainly owing to its contactless nature, high spatial and temporal precision, and mature ray controllability promised by geometric optics, and thus culminates the most well-known optical tweezer for trapping and dislodging of micro-objects. Unlike solids, fluids span a wide spectrum of surface tensions and are intrinsically divisible, which demands an effective technique for their manipulation that could work for various fluids and perform merging, dispensing, and splitting in addition to navigating. It has been a long-standing challenge to reconcile the convenience of light and stringent demands required for liquid manipulations.

Several approaches have been exploited for photo-manipulation of liquids. They leverage the energy conversion of photoelectric, photochemical, photothermal, and photo-mechanical type associated with optoelectrowetting devices, light-responsive molecules, thermocapillary effect, and photodeformation of liquid crystal polymers, respectively, to materialize precise navigating and merging of fluids. However, those methods fail to split and manipulate fluids in a loss-free manner. Because of the residues, cycled washes/cleanings become necessary in processing liquids laden with different reagents, seriously increasing the time and cost involved. Moreover, most of them work only for a very narrow range of liquids and normally fail to perform for fluids with a low surface tension such as oils, alcohols, and other organic solvents because of the incompatibility between system configurations and liquid properties and the strong pinning forces caused by the preferential wetting. To date, the lossfree manipulation of such low-surface tension liquids has remained challenging because of associated issues like easy spreading and increased contact angle hysteresis.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

Here, simply stacking three homogeneous layers: a photothermal film (graphenedoped polymer), a pyroelectric crystal (lithium niobate wafer), and a superomniphobic surface (silica nanosphere network), that work in concert to enable loss-free operations of even ultralow-surface tension fluids with a single beam of light. The photothermal film is composed of graphene-polymer composite, which senses the light stimuli and responses by generating the localized and uneven thermogenesis. Consequently, the pyroelectric crystal converts the heat into extra electric charges, forming a wavy dielectrophoretic force profile that can trap, dispense, and split fluids. The superomniphobic surface interfaces fluids in a frictionless manner via maintaining an ultrastable Cassie state and preventing liquid residues. With a single beam of light serving as the stimuli, our technique can remarkably perform all four fundamental operations (movement, merging, dispensing, and splitting) of various liquids (surface tension from 18.9 to 98.0 mN $m^{-1}$; maneuverable fluid volume from 0.001 to 1000 μl) in a well-controlled and loss-free manner (liquid or reagent loss being only 0.5% of that associated with conventional techniques), without the need of complicated electrodes and high-voltage circuits. There is great potential in substantially advancing vast fields, microassays, medical diagnosis, and droplet-enabled manufacturing and engineering, to name a few.

Precision manipulation of various liquids is essential in many fields. Unlike solid objects, fluids are intrinsically divisible, enriching their fundamental operations with merging, dispensing, and splitting on top of moving. Fluids are sticky as well, calling for their lossless manipulation to prevent mass loss and contamination. Presented herein are photopyroelectric microfluidics that meet all the requirements. In response to the irradiation from even one single beam of light, the platform creates a unique wavy dielectrophoretic force field that is remarkably capable of performing desired loss-free (loss being 0.5% of existing one) manipulation of droplets of surface tension from 18.9 to 98.0 mN $m^{-1}$ and volume from 1 nl to 1000 μl, functioning as a "magic" wetting-proof hand to navigate, fuse, pinch, and cleave fluids on demand, enabling cargo carriers with droplet wheels and upgrading the limit of maximum concentration of deliverable protein by 4000-fold.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF SUMMARY OF THE DRAWINGS

FIG. 1(*a*) include schematics showing the closed and open DMF configurations. FIG. 1(*b*) includes an image of DMF showing the droplets manipulation by activating the underlying electrode array.

FIG. 2(*a*) depicts schematics of the pyroelectric platform where droplets are controlled by light. FIG. 2(*b*)

depicts schematics showing the mechanism of the platform. FIG. 2(*c*) depicts a Scanning electron microscopy (SEM) image of the superomniphobic surfaces. Inset is the image of a 5 μl silicone oil on the superomniphobic surfaces. FIG. 2(*d*) depicts an image of the lithium niobate wafer. FIG. 2(*e*) depicts an SEM image of the cross section of the graphene-nanoplatelets-doped elastomer thin film.

FIG. 4(A) depicts a schematic of the trilayered photopyroelectric platform consisting of the superomniphobic surface (silica nanosphere network), pyroelectric crystal (lithium niobate), and photothermal film (graphene-doped polymer) where droplets are controlled by a near-infrared (NIR) light. FIG. 4(B) depicts schematics showing the mechanism of photopyroelectric microfluidics. As light irradiates, the photothermal film composed of graphene nanoplatelets produces heat because of photothermal effect. Through heat transfer, the temperature within the pyroelectric crystal rises, prompting surface free charges, which drives the droplet into motion through dielectrophoretic force. FIG. 4(C) depicts a scanning electron microscopy (SEM) cross-sectional image of the superomniphobic surface. Inset is the image of a 5-μl silicone oil residing on the surface with a contact angle of 151°. FIG. 4(D) depicts as the temperature increases, the spontaneous polarization of pyroelectric crystal decreases, giving rise to extra surface free charges. FIG. 4(E) depicts a cross-sectional SEM and energy-dispersive x-ray spectroscopy images of the graphene-polymer composite film, showing homogeneously dispersed graphene. FIG. 4(F) depicts sequential images showing a continuous manipulation of a 5-μl silicone oil using a 785-nm laser. Laser is turned on at 0 s, unless otherwise specified. FIG. 4(G) depicts chronophotographs showing a continuous manipulation of an ethanol droplet. FIG. 4(H) depicts chronophotographs showing a continuous manipulation of an n-heptane droplet. FIG. 4(I) depicts chronophotographs showing a continuous manipulation of a glycerol droplet.

FIG. 5(A) depicts an image of droplets of water, ethanol, acetone, dichloromethane (DCM), silicone oil (PDMS), n-heptane, dimethylformamide (DMF), and ethyl acetate residing atop the translucent superomniphobic surface. FIG. 5(B) depicts an SEM image showing the fractal network of the superomniphobic surface. Inset shows the typical inverted structures. FIG. 5(C) depicts super-repellency toward various liquids. FIG. 5(D) depicts an adhesive force is inversely proportional to the surface tension. Error bars denote SD of three independent measurements. FIG. 5(E) depicts a liquid residue detected on diverse omniphobic surfaces by fluorescence imaging. FIG. 5(F) depicts fluorescence intensity and area fraction of the images in FIG. 5(E), showing the remarkably reduced liquid loss on the superomniphobic (SOP) surface. Error bars denote SD of three independent measurements. FIG. 5(G) depicts sequential images showing an n-heptane droplet ($r0\approx1$ mm, $We\approx20$) bounces on the surface, exhibiting low adhesion toward organic liquids. Time interval between each snapshot is ~4 ms. FIG. 5(H) depicts an infrared thermal imaging and the plot showing the temperature distribution on photothermal film upon 400-mW laser irradiation. FIG. 5(I) depicts the thermal response of graphene-PDMS composite films with varying contents of graphene nanoplatelets to 400-mW laser irradiation. Blue and red shaded regions denote off and on states, respectively, of the 785-nm laser. FIG. 5(J) depicts the thermal response of PDMS film containing 5 wt % graphene nanoplatelets to laser power. The solid lines are from theoretical analysis (see note S2 for details).

FIG. 6(A) depicts typical decaying oscillation of a 5-μl water droplet using a 400-mW NIR laser irradiation. After four oscillations, the droplet is immobilized at the edge of the laser spot. The red dashed line denotes the position of the laser spot center. Laser is turned on at ~−40 s. FIG. 6(B) depicts temperature mapping within the pyroelectric crystal through numerical study. FIG. 6(C) depicts a plot of the electric field strength lines (left) and electric potential (right) obtained using the finite-element method. FIG. 6(D) depicts mapping of $Er(\partial Er/\partial r)$ surrounding the heated pyroelectric crystal. The laser beam irradiates on the region of $0<r<1$ mm. LN, lithium niobate. FIG. 6(E) depicts a spatial profile of $Er(\partial Er/\partial r)$ and droplet acceleration. Green solid line represents the simulated $Er(\partial Er/\partial r)$ along the extracted line shown in FIG. 6(D); blue solid line represents the theoretical $Er(\partial Er/\partial r)$ with the point-charge assumption (see note S5); red line and orange dots represent the calculated and measured droplet accelerations, respectively; and blue and purple dots, respectively, denote the positions where dispense and split happens. The laser beam irradiates on the region of $-1$ mm$<r<0$. The measured accelerations are averaged values of five frames in 5 ms, and the error bars denote the SD of the average. FIG. 6(F) depicts the radius of fluids' trapping domain is in proportion to the product of surface tension and Clausius-Mossotti factor. Error bars denote SD of three independent measurements. The results are obtained after laser irradiates for ~40 s.

FIG. 7(A) depicts schematics showing four fundamental fluidic operations, including navigate, merge, split, and dispense.

FIG. 7(B) depicts guided motions of a 0.001-ml silicone oil and 200-ml water droplets, showing the broad controllable volume range. FIG. 7(C) depicts infrared thermal imaging showing the temperature distribution within pyroelectric crystal along the direction of moving laser spot. FIG. 7(D) depicts sequential images showing the merge between two isolated water droplets. FIG. 7(E) depicts sequential images showing the split of an ethanol droplet upon a centered prolonged irradiation. Laser is turned on at ~−2 s. FIG. 7(F) depicts sequential images showing the dispenses of liquid portions from a silicone oil droplet through offset prolonged irradiation.

FIG. 8(A) depicts sequential images showing droplets ascend uphill on the platform tilted at 6°. Laser is turned on at ~−2 s. FIG. 8(B) depicts a chronophotograph showing the droplet's climbing of the vertical wall. FIG. 8(C) depicts a chronophotograph showing a photo-controlled cargo carrier with four droplet wheels carrying a solid cargo. White dashed circle denotes the driving droplet. FIG. 8(D) depicts a chronophotograph showing the lossless manipulation of a 20 mg ml−1 FITC-BSA droplet on the photopyroelectric microfluidics platform, enhancing the maximum concentration of deliverable protein by 4000-fold. FIG. 8(E) depicts sequential images showing the detection of glycine using the fundamental fluidic operations on the platform.

DETAILED DESCRIPTION

Figure 1:
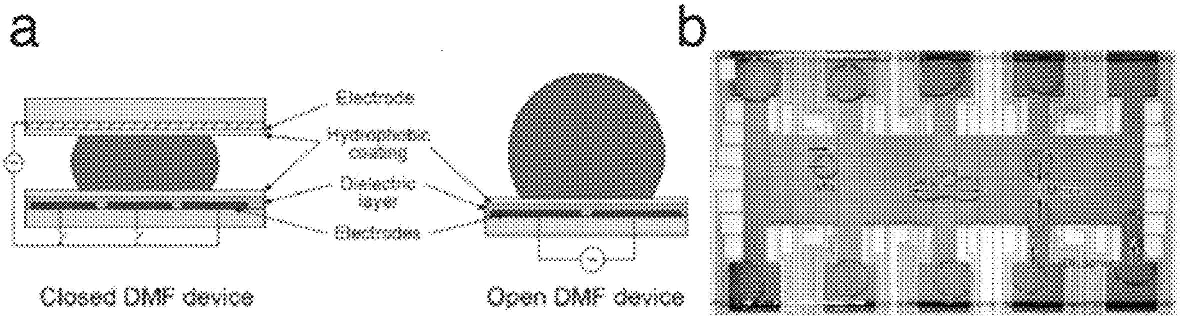
FIG. 1 depicts the digital microfluidics for on-plane droplets transport.

On-plane transport of liquids in a loss-free manner is a difficult task because of the non-negligible surface tension forces which inevitably incur issues such as pinned droplets and substantial liquid residues. By assembling a superomniphobic surface, pyroelectric crystal, and photothermal thin film from top to bottom, the trilayered device acts as a platform where motions of liquids can be guided by a near infrared light. The platform is retention-proof as no liquid residues can be observed behind the droplets' trails.

To ensure the accuracy and obviate the cross-contaminations, liquid transfer disposables such as micropipette tips and microtubes are omnipresent in fields such as healthcare and pharmaceutical industries, increasing the cost of diagnosis and therapy. Once used, the disposables are contaminated with body fluids or hazardous chemicals, threatening the environmental safety and complicating the waste management. On our platform, the liquids' motions can be well controlled because of the remarkable spatial and temporal precision offered by light. Moreover, the unique retention-proof feature makes our platform suitable for repeated usage without any cycled wash or replenishments, enhancing both time and cost efficiency. As a result, the usage of the medical or experimental disposables can be circumvented, reducing the healthcare cost and minimizing environmental impacts.

The liquids manipulation platform described herein is a new product to transport liquids. The manipulation platform consists of a superomniphobic surface, pyroelectric crystal, and photothermal thin film. The motions of liquids can be precisely controlled by light illuminations. A wide range of liquids, including aqueous and organic liquids can be manipulated in a loss-free manner.

The platform is in an open form (in closed form, droplets are sandwiched between upper and lower components of a platform), facilitating the integration of detecting and analyzing devices.

On most platforms, the liquids are commonly actuated by electric and magnetic forces. For electric actuation, complex circuits are designed and bulky facilities such as voltage sources are required. For magnetic actuations, usually droplets have to be doped with magnetic particles to make them magnetic-responsive. On most platforms, only conductive liquids of high surface tension such as water or aqueous solutions can be manipulated, making them inapplicable for nonpolar liquids. Liquid residues are frequently left on the platform surfaces, making the transported volumes inaccurate and processes prone to cross-contaminations.

Using the trilayered device described herein, the incident near infrared light can be converted into thermogenesis through photothermal effect of underlying thin film. Then through pyroelectric effect, the generated heat prompts surface charges which creates nonuniform electric fields. As a result, droplets can be attracted towards the light-irradiated spot through dielectrophoretic forces. Thereby, the platform described herein is portable and no modification on the droplets is required. The generated radial electric fields enable droplets to be transported through dielectrophoresis which is applicable for both conductive and dielectric liquids. The platform surface is treated to be superomniphobic which minimizes wetting and retention for a wide spectrum of liquids, including aqueous solutions and oils.

To actively control the locomotions of liquids, various platforms are developed. Among them, digital microfluidics (DMF) have been well developed and widely reported. As shown in FIG. 1*a*, the configurations of DMF can typically be classified into closed format or open format. As the major components, the actuating and ground electrode arrays are either separately housed in two plates (closed format) or placed into a single plate (open format). Electrode arrays are fabricated through complex micro-/nano-fabrications and are then covered with an insulating layer to prevent electrolysis and limit current. An additional hydrophobic coating is applied on top of the insulating layer. To overcome the non-negligible contact line pinning on the hydrophobic surface, high voltages are applied to induce electrical forces on free charges in the droplet meniscus or on dipoles inside the droplet. In this way, liquid droplets can be actuated on a planar surface (FIG. 1*b*). The DMF provides us with an efficient tool for handling and transporting droplets with high flexibility. However, the applied high voltage is incompatible with some biological applications. Adsorption of reagent and liquid residues on a hydrophobic substrate impedes the droplet motion on DMF and causes intersample cross-contamination. Moreover, the droplets sizes have to be larger than the inter-electrode distance, otherwise, motions cannot be induced by activating electrodes. Thereby, the loss-free transport of liquids without stringent stimuli still remain out of reach.

Transporting or moving a liquid in a substantially loss-free manner means that a liquid is moved from a first location of the trilayer platform to either a second location on the trilayer platform or off of the trilayer platform such that at least 99.95% by weight of the liquid is moved or transported. In other embodiments, at least 99.995% by weight of the liquid is moved or transported. In still other embodiments, at least 99.999% by weight of the liquid is moved or transported. An in still other embodiments, the liquid is moved or transported liquid in a loss-free manner such no readily detectable trace amounts of the liquid remain present on the trilayer platform.

Figure 2:
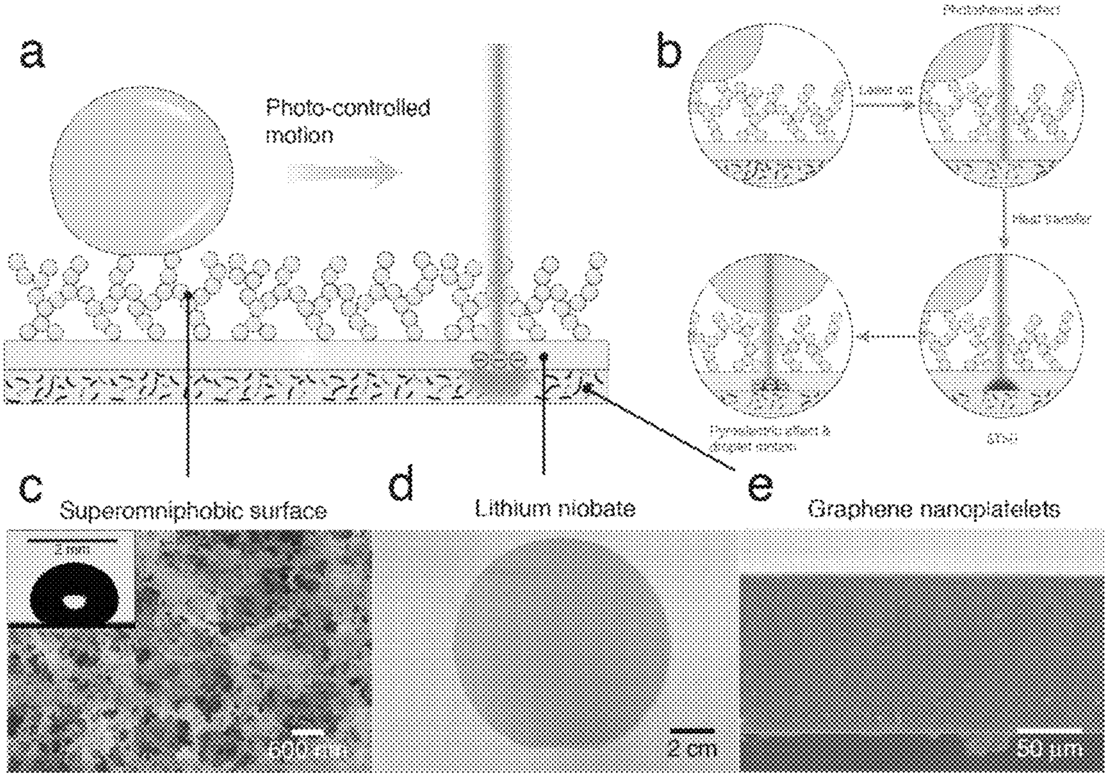
FIG. 2 depicts design of the trilayered pyroelectric platform.

To enable precise and loss-free droplets manipulation, provided herein is a trilayered compact device where liquids can be actively guided by light illumination without any residues on their trails. As shown in FIG. 2*a*, the platform is assembled by stacking a photothermal thin film, pyroelectric crystal, and superomniphobic surface from bottom to top.

As shown in FIG. 2*b*, the topmost superomniphobic surface and intercalated pyroelectric crystal are transparent to near infrared (NIR) light, thereby external light irradiation can readily reach the underlying photothermal materials, prompting instant thermogenesis. The heat increases the localized temperature of the pyroelectric crystal, reducing its spontaneous polarizations.

As a result, unbalanced net surface charges are generated, giving rise to nonuniformly distributed electric fields. The superomniphobic surfaces resist the wetting and minimize the substrate pinning. Thereby, a wide spectrum of liquids, including aqueous solutions, organic liquids, remain spherical and have high mobility on the platform (FIG. 2*c*). The generated electric fields induce dielectrophoretic forces on spherical droplets, overcoming the negligible resistances and attracting droplets towards the irradiated spot. In this way, locomotions of droplets can be well controlled through a light beam, offering remarkable advantages such as contactless interaction, high spatiotemporal precision, and ready controllability.

The bottom photothermal layer is a composite thin film fabricated by doping 5 wt % graphene nanoplatelets into transparent elastomers (FIG. 2*e*). The graphene nanoplatelets strongly response to NIR irradiation and produce heat. The elasticity of the thin film allows it to maintain intimate contact with the pyroelectric crystal (FIG. 2*d*), facilitating fast and efficient heat transfer. The intercalated pyroelectric crystal is a lithium niobate (LN) wafer. The crystal has a pyroelectric coefficient of Pc (for LN at 25° C., Pc=−8.3×10−5 C m−2° C.−1), as temperature increases by $\Delta T$, a surface charge density of $\sigma = Pc\ \Delta T$ emerges, producing a radially-distributed electric field near the irradiated spot.

Figure 3:
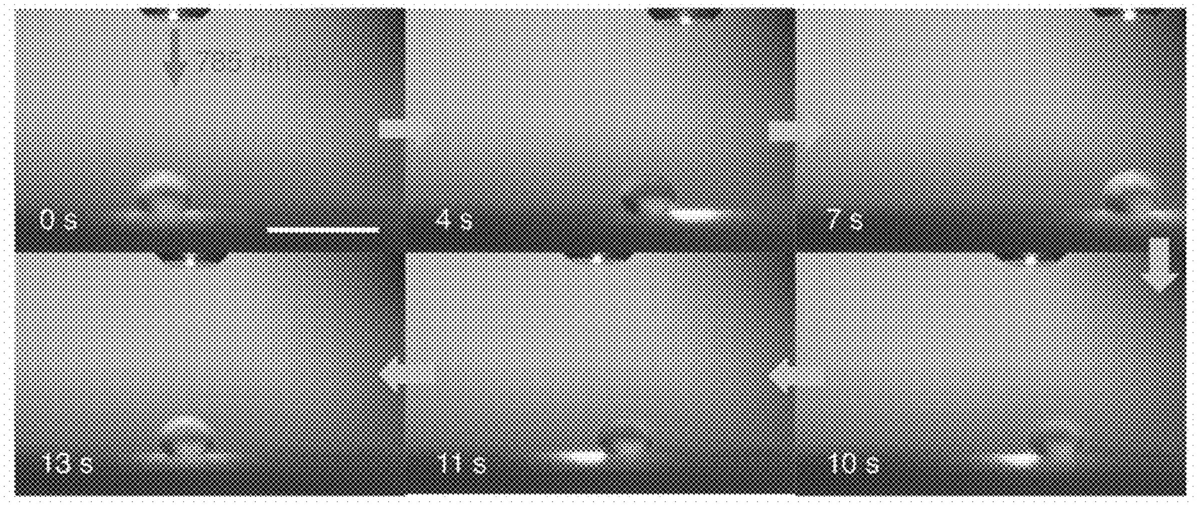
FIG. 3 depicts time-lapsed images showing the manipulation of a silicone oil droplet on the trilayered pyroelectric platform.

The top superomniphobic layer is fabricated by depositing sparsely-distributed silica nanoparticles on a thin glass wafer, followed by chemical vapor deposition of a monolayer of fluorinated alkyl silane. The nanostructured surface exhibits fractal-like network in re-entrant forms, allowing the liquid meniscus to be suspended among sparse asperities. As a result, a wide spectrum of liquids such as water, oil and alcohol bead up with a contact angle higher than 150° and readily slide with a roll-off angle lower than 5°. We demonstrate the manipulation of a 5 μl silicone oil droplet (surface tension $\gamma$=19.8 mN $m^{-1}$) on the fabricated platform using 0.4 W laser irradiation. As the laser is turned on, the nearby silicone oil droplet rapidly responses and rolls towards the light spot (FIG. 3). The droplet is finally precisely positioned below the illumination. By translating the laser, the droplet can be consecutively manipulated on the platform.

Figure 4:
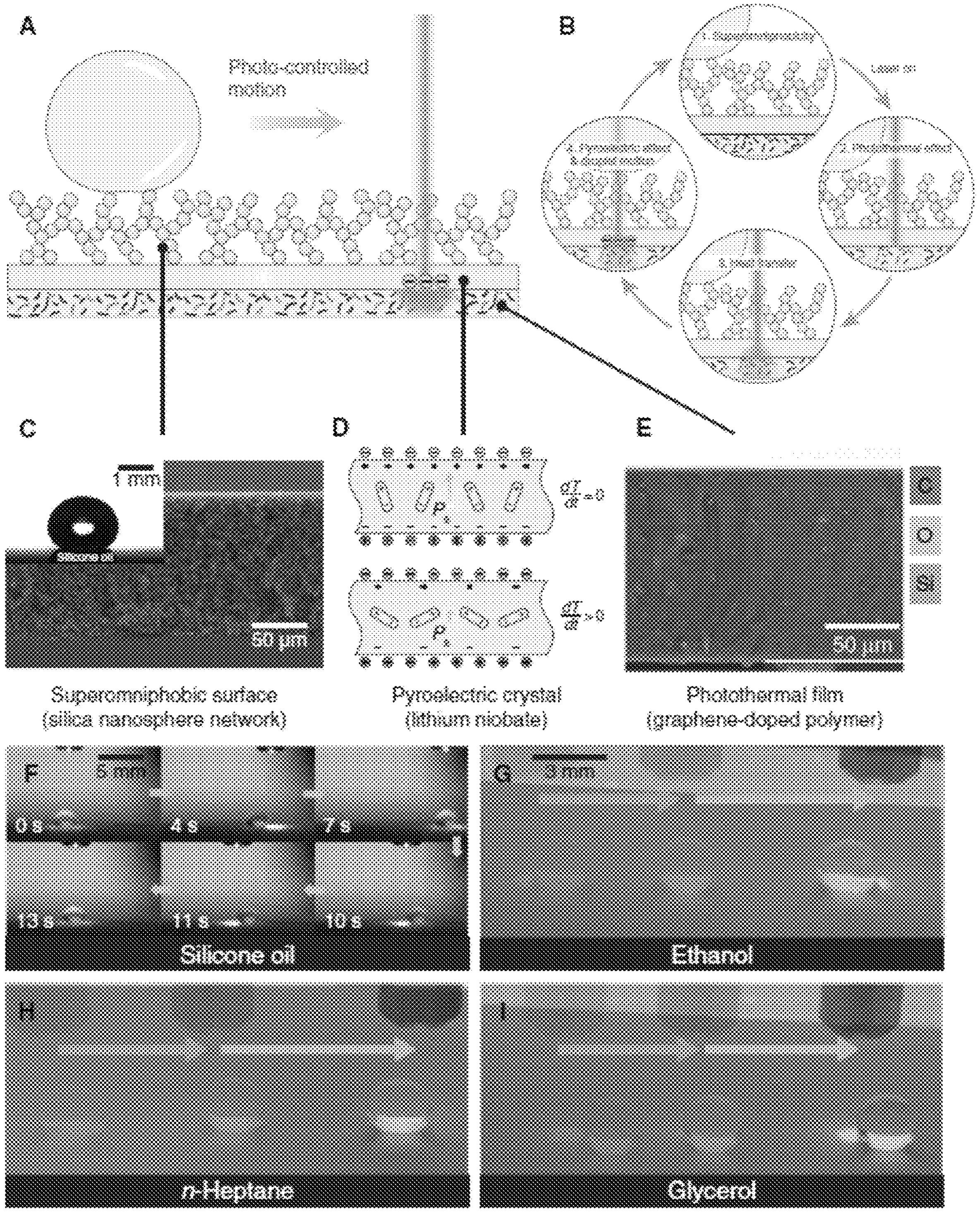
FIG. 4 depicts the design of photopyroelectric microfluidics.

The platform is readily fabricated by closely sandwiching a thin pyroelectric crystal (lithium niobate wafer) between a superomniphobic thin film (silica nanosphere network) and a photothermal thin film (graphene-doped polymer) (FIG. 4, A to E). For the top superomniphobic layer, we use a nanoscale fractal network fabricated via sintering hollow silica spheres covering with fluorinated surfactants for super-repellency (FIG. 4C). On such sur-face, even silicone oil (18.9 mN $m^{-1}$) exhibits a contact angle q of 151°. For the bottom layer, we homogenize the graphene nanoplatelets with polydimethylsiloxane (PDMS) and then cure the polymer to form a uniform composite film (FIG. 4E). As a beam of near-infrared (NIR) light irradiates from the top, the translucent superomniphobic surface and pyroelectric wafer become a transparent window, allowing the NIR to readily reach the underlying composite polymer film (FIG. 4B). The strong photothermal effect of graphene nanoplatelets produces spatially uneven localized temperature rise. Through interfacial heat transfer, the pyroelectric crystal is subsequently heated. As a result, the spontaneous polarization within the crystal is reduced, lowering the bound surface charges and giving rise to extra surface free charges. Droplets atop the superomniphobic surface can then be driven toward the irradiated spot by dielectrophoretic force.

The techniques described herein have proven to be effective for a wide spectrum of liquids (surface tension from 18.9 to 98.0 mN $m^{-1}$). As shown in FIG. 4 (F to I), the motions of different organic liquids such as silicone oil, alkanes (n-heptane), and alcohols (ethanol and glycerol) can be readily guided by an NIR light beam. Such platform works as a channel-free and open-space fluidic processor, without any electrodes or micropatterning needed in its counterpart techniques (such as digital microfluidics), which requires high-voltage circuits and multistep microfabrications in clean rooms.

Figure 5:
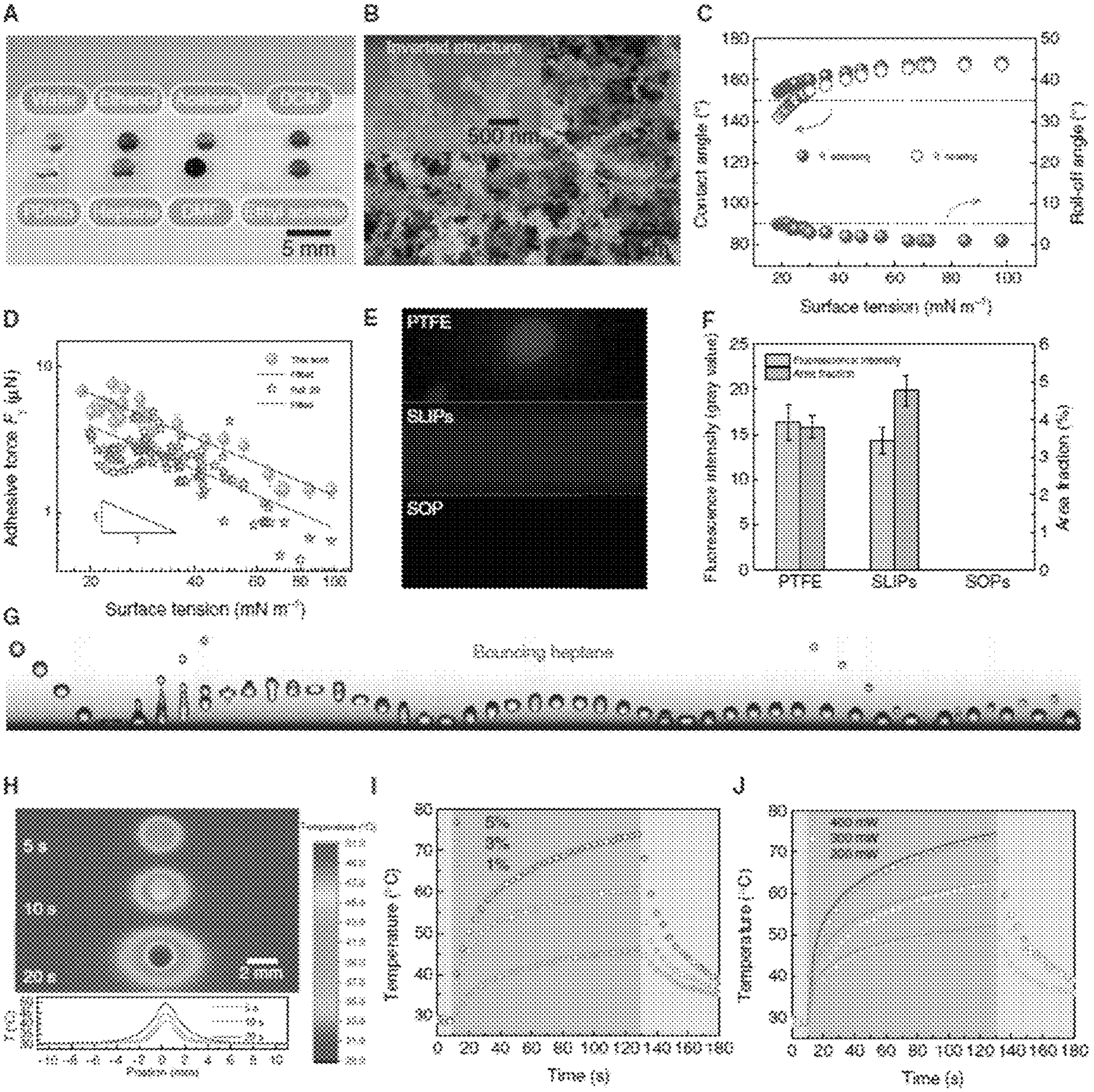
FIG. 5 depicts the characterization of the fluid interfacing and light sensing.

Numerous inverted microstructures cap the fractal network of superomniphobic surfaces (FIG. 5B) and provide additional supports to suspend diverse liquids such as water, silicone oil (PDMS), ethanol, n-heptane, acetone, dimethylformamide (DMF), dichloromethane (DCM), and ethyl acetate in Cassie states (FIG. 5A). Fluids with surface tension spanning from 18.9 to 98.0 mN $m^{-1}$ have large contact angle (150° to 170°) and low roll-off angle (≤5°) on the prepared superomniphobic surfaces (FIG. 5C). Moreover, the surface is chemical resistant to corrosive acids and bases, including concentrated $HNO_3$, $H_2SO_4$, and KOH, and can maintain a stable Cassie state atop it, making it suitable for chemical fluidic processing.

By measuring the critical roll-off angles, we can calculate the lateral adhesive force acting on the droplet through its balance with the on-plane gravitational force $F\gamma$=mg sin $\theta_{roll-off}$, where m, g, and $\theta_{roll-off}$ denote the mass of droplet, gravitational acceleration, and roll-off angles, respectively. As shown in FIG. 5D, the lateral adhesive force is inversely proportional to the surface tension. To verify such counter-intuitive negative linear correlation, we compare with those in other reported works such as in FIG. 5D, showing agreement with our work. Such phenomenon may originate from the fact that although the surface tension decreases, more microscopic liquid/solid contacts develop and thus yield the increased lateral adhesive force.

The mobility of fluids on the surface is further verified by liberating an n-heptane (20.1 mN $m^{-1}$) droplet from a height of ~3 cm (FIG. 5G). After four rebounds, the n-heptane lastly rests on the surface. Even the ejected tiny satellite droplet can rebound on the surface as well, showing the high mobility of fluids on the surface.

Although the mobility implies ready motion, it cannot guarantee that the loss of liquid or reagent is small. To probe the liquid retention, fluorescence imaging is performed using Nile red (1.0 mg $ml^{-1}$) in silicone oil as the test fluid. Another two commonly used liquid-repellent surfaces, polytetrafluoroethylene (PTFE) film and slippery liquid infused porous surface (SLIPs), are used for comparisons. A test droplet is allowed to roll off or slide on the three types of surfaces tilting at an angle of 5°. As shown in FIG. 5E, obvious liquid residues are observed on the PTFE film, and its surface is contaminated by pollutants in ambient environments. Although no liquid residue is left on the SLIPs, obvious reagent traces are detected. In sharp contrast, no residue can be probed on our prepared superomniphobic surface essentially. A careful examination shows that on the superomniphobic surface, the fluorescence intensity and fraction area are only 0.6 and 0.5% of those on the PTFE surface (FIG. 5F), implying a nearly loss-free contact with the fluids. Then, the light-sensing component of the system is examined. As a beam of 785-nm laser irradiates, the temperature peaks at the laser spot center and decays toward its surroundings as shown by the infrared thermal imaging (FIG. 5H). As light illuminates at a power of 400 mW, the temperature of 5 weight % (wt %) graphene composite film rapidly ramps to 40° C. in 5 s, a level enough to drive droplets into motions (FIG. 5I). Thereby, a 5 wt % graphene composite film is used to sense the light. The impact of laser power on the thermogenesis is also examined (FIG. 5J). The temperature rise depends linearly on the power, which is consistent with the theoretical analysis using a semi-infinite body heat transfer model. Therefore, the technique described herein converts irradiated light spot into a sharply bulged temperature profile, interacts with fluids in a frictionless and loss-free manner, and works for a wide variety of fluids.

Figure 6:
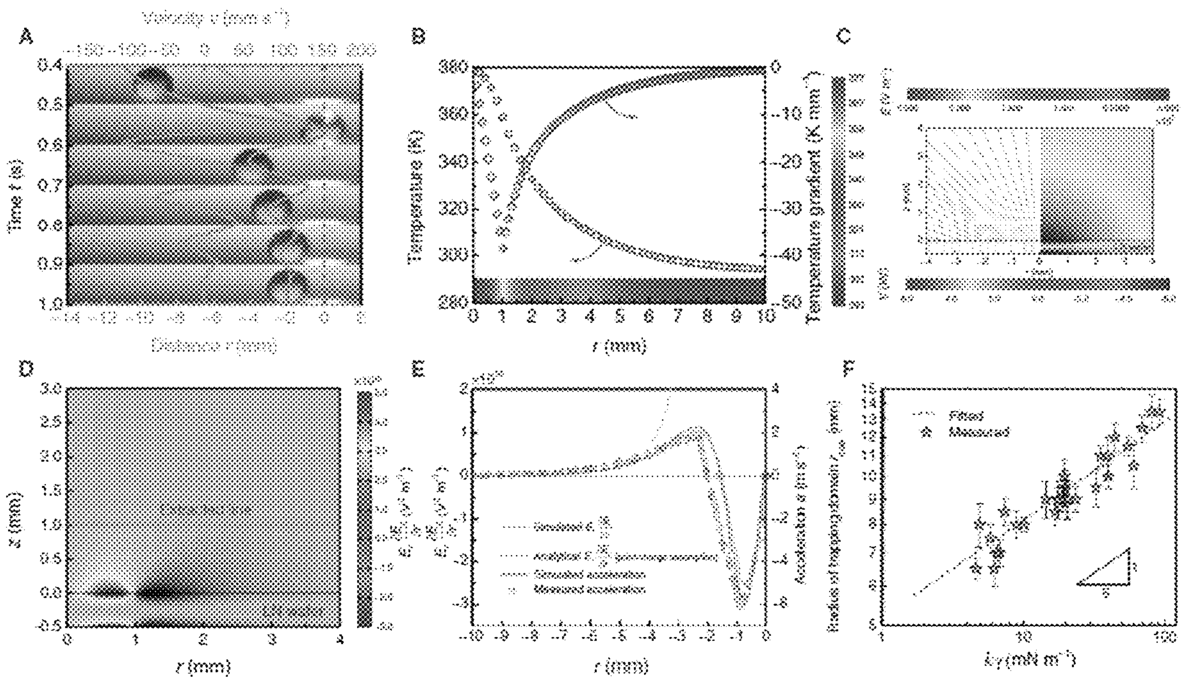
FIG. 6 depicts droplet dynamics on photopyroelectric platform.

To understand the actuation mechanism of the photopyroelectric platform, the motion behavior of a 5-μl water droplet initially placed at a position ~13 mm away from the light spot center is examined (FIG. 6A). After the laser is turned on, the droplet is attracted toward the illumination in a damping oscillation manner.

The droplet initially accelerates toward the laser and rapidly brakes and reverses its direction once it reaches the light spot's edge. Such decaying oscillation lasts for four cycles, after which the droplet is trapped at the position ~2 mm away from the laser spot center, a position slightly offset from the laser spot center.

To detail the manipulation and unravel the underlying physics, a numerical simulation is performed to study the droplet dynamics. Temperature distribution in pyroelectric crystal is first simulated using a finite-element method by considering the light-triggered thermogenesis as the source term in the heat conduction equation (FIG. 6B). The surface charge density a in the crystal varies linearly with the temperature rise as $\sigma = Pc\Delta T$, where Pc and $\Delta T$ denote the pyroelectric coefficient and change of temperature, respectively. The electric field strength E is then simulated by applying a charge density boundary condition of $\sigma$ on the lithium niobate wafer surface (FIG. 6C).

The dielectrophoretic force FE on the droplet from the nonuniform electric field can be approximated as follows $$F_E = 4\pi r_0^3 k\varepsilon_0 (E\cdot\nabla)E \quad (1)$$

where $r_0$ is the radius of the droplet, k is the Clausius-Mossotti factor ($k=(\varepsilon-\varepsilon_0)/(\varepsilon+2\varepsilon_0)$), and $\varepsilon_0$ and $\varepsilon$ are the permittivity of air and droplets, respectively. Equation 1 is derived under the assumption that the dipole is small compared with the scale of nonuniformities of electric field. We use it to correlate $F_E$, with E at the droplet mass center as the first-order approximation. In a two-dimensional configuration, only the dielectrophoretic force is considered in the r direction and neglect the field strength variation in the z direction for simplicity. The lateral dielectrophoretic force thus reads $$F_{E,r} = 4\pi r_0^3 k\varepsilon_0 E_r \frac{\partial E_r}{\partial r} \quad (2)$$

where $E_r$, is the r-component of electric field strength. Thereby, the dielectrophoretic force $F_{E,r}$ is mainly determined by the variation of $E_r$, ($\partial E_r/\partial r$) along the r-direction.

On the basis of the simulation results, the $E_r$, ($\partial E_r/\partial r$) changes rapidly and reverses its sign at the edge of the laser spot (FIG. 6D). The droplet will then experience attraction when it is far away from the laser spot, but repulsion once moved into the irradiated region and be lastly immobilized at the edge of the laser spot, the position where the potential energy is the lowest. It is simply assumed that the dielectrophoretic force acts at the droplet's center of mass, which is ~1 mm above the pyroelectric crystal surface. Therefore, the $E_r$, ($\partial E_r/\partial r$) is extracted from such position to calculate the dielectrophoretic force. The general profile of $E_r$, ($\partial E_r/\partial r$) is similar for different extracting positions, but its magnitude increases as the position approaches the platform surface. The acceleration is then calculated on the basis of the numerical results using the equation as follows $$F_{E,r} - F_\gamma = ma \quad (3)$$

Upon irradiation, the temperature gradient on the superomniphobic surface is so weak that the force caused by the thermocapillary effect is two orders of magnitude lower than the dielectrophoretic force; thereby, the thermocapillary effect is neglected here. To verify the simulation, the acceleration of a 5-μl water droplet is experimentally determined during the damping oscillation by recording its motion trajectory. As shown in FIG. 6E, the calculated acceleration agrees well with the measured one, confirming the wavy force profile experienced by the moving droplets. The maximum dielectrophoretic force for the tested liquids is calculated to be ~10 μN, a value large enough to overcome the lateral adhesive forces from the superomniphobic surface.

The above derivation details the variation of actuation as the droplet is proximate to the laser irradiation. When the droplet is far away from the laser spot, the analysis can be further simplified to determine the onset condition of droplet motion. With such condition, the surface charges can be approximated to be a point charge, whose field strength is described by the Coulomb's law, $(E\cdot\nabla)E \propto r^{-5}P^2$, where P denotes the laser power. As shown in FIG. 6E, the analytical $E_r$, ($\partial E_r/\partial r$), denoted by the blue line, agrees well with the simulated one when a droplet is more than 5 mm away from the laser spot. Thus, the dielectrophoretic force reads $F_E \propto kr^{-5}P^2$. The further away the droplets, thereby, the longer irradiation time is required to actuate it. On the onset of droplet's motion, the dielectrophoretic force balances the lateral adhesive force. As the adhesive force varies inversely with the surface tension $\gamma$, we can obtain the maximum radius $r_{max}$ of trapping domain, the maximum initial distance from the laser spot where droplet can be actuated by a laser illumination, as $r^5_{max} \propto k\gamma P^2$. By varying the liquid types, we confirm this relationship in FIG. 6F. Therefore, the higher relative permittivity and surface tension the liquid has, the easier the droplet can be moved.

Figure 7:
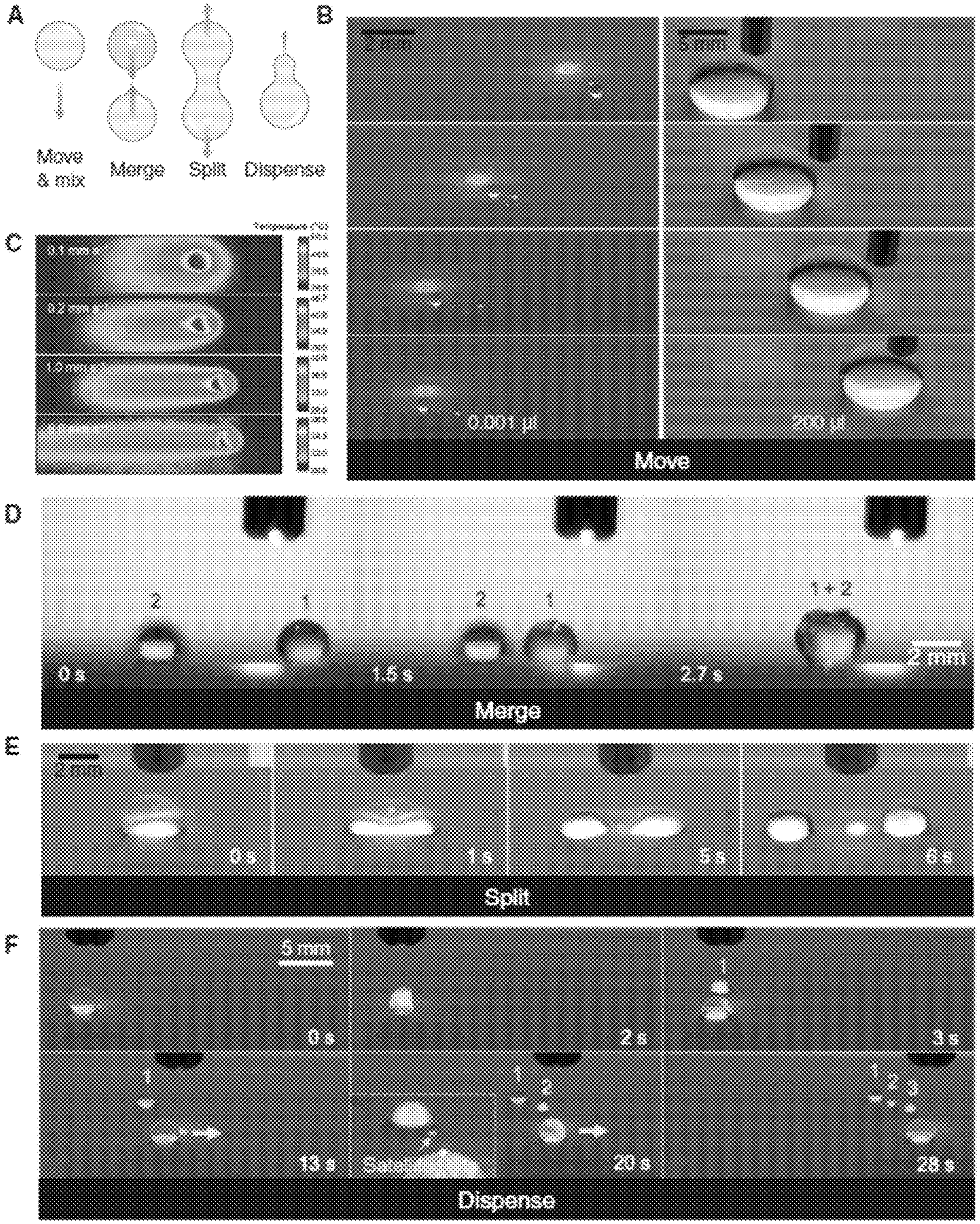
FIG. 7 depicts fluidic operations.

With the photopyroelectric platform, various fluidic operations can be performed using a single beam of laser light (FIG. 7A). As shown in FIG. 7B, the wavy dielectrophoretic force profile (similar to a distorted sine wave) can unexpectedly trap and move droplets with a volume as low as 0.001 μl, which is two orders of magnitude lower than that of its electric counterparts. A 200-μl liquid puddle can be losslessly handled on the platform as well. Such a broad volume range of fluids can facilitate the further miniaturization of various biomedical systems. However, there is a maximum laser-moving velocity beyond which the droplet cannot keep up with the laser movement. As shown in FIG. 7C, the faster the laser moves, the shorter time the platform is irradiated, thus leading to a lower local temperature. By increasing the laser power, such a maximum laser speed can be increased. The motion control on the platform enables the merging of droplets naturally as shown in FIG. 7D.

The droplet can be split and even dispensed with one single beam of laser light through prolonged laser irradiations (~5 s). As shown in FIG. 7E, the laser spot is positioned at the center of a droplet. After 5-s irradiation, the wavy dielectrophoretic force profile enables a diverging force in the opposite direction (denoted by the purple dot in FIG. 6E). The droplet is then stretched gradually, forming two separating lobes. Once the force is strong enough to overcome the surface tension, the droplet undergoes fission, giving rise to two portions apart from each other. Similarly, as shown in FIG. 7F, by simply offsetting the laser, the droplet is positioned in the local trapping spot (denoted by the blue dot in FIG. 6E). Longer irradiation creates an opposite but slightly different force pair. Such forces prompt the ejection of a smaller liquid portion from the liquid reservoir. Such light-mediated liquid split and dispense have not been reported before. Thereby, the photopyroelectric platform fully exploits the divisible nature of liquid and provides a full landscape of fluidic operation in a well-controlled manner.

Figure 8:
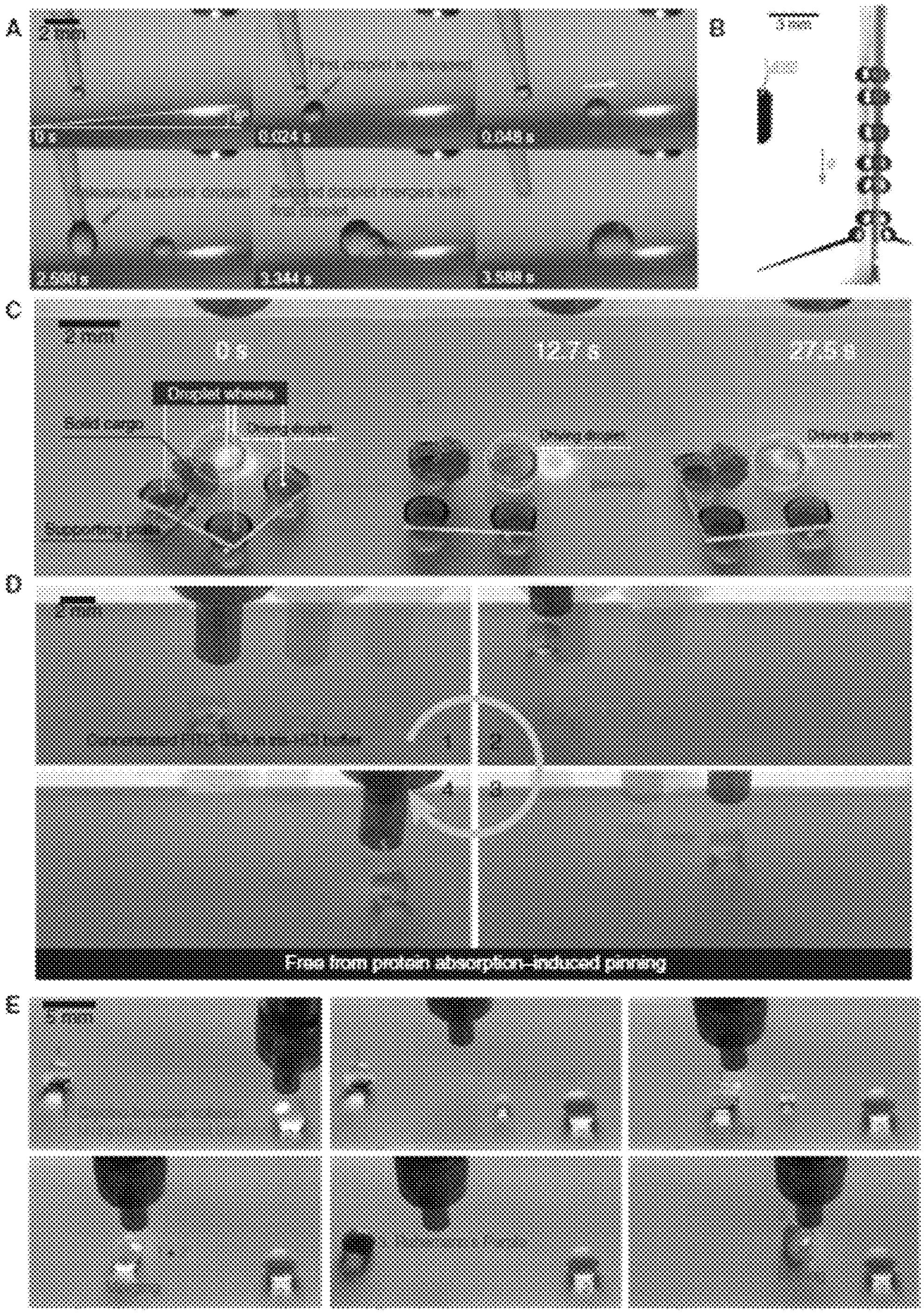
FIG. 8 depicts versatility and biomolecule compatibility.

Because of the extremely low friction, a droplet on the superomniphobic surfaces is normally susceptible to slight unevenness, which could lead to failure of reliable droplet control. The platform herein exhibits, however, a strong navigating force that can enable the droplet to even ascend uphill. As shown in FIG. 8A, the droplet is elongated by the attractive force as it approaches the surface. Upon its detachment, the droplet rapidly rolls uphill at a velocity >150 mm $s^{-1}$. After a typical damping oscillation, the droplet is immobilized near the light spot at 0.280 s. Similarly, a second droplet is released and then ascends the slope, merging with the first one and is trapped by the light irradiation. Moreover, as the platform is placed vertically, the droplet can even ascend upward, defying the gravity (FIG. 8B).

The superior technique described herein for precision manipulation of various liquids at the micro-/nanoliter scale enables the deployment of millimeter-scale cargo carriers that are of fundamental importance in many fields. As shown in FIG. 8C, a cargo carrier with four liquid wheels can be actively and remotely photo-controlled on the platform. A single beam of light can readily steer, actuate, and brake the carrier. The carrier undergoes guided transport at a velocity as high as 1.0 mm $s^{-1}$. Such a light-driven cargo carrier can work as robots with soft feet for on-demand transportations of tiny solid objects required in many fields.

The techniques herein effectively circumvents the long-standing protein absorption challenge encountered in digital microfluidics as well via remarkably upgrading the limit of maximum concentration of deliverable protein by 4000-fold. The high actuation voltages (~100 V) needed in conventional digital microfluidics yield the adsorption of biomolecules onto device surfaces. Such undesired biofouling distorts the assay fidelity and weathers overall performances due to its hindering of the liquids' motions. Without extra additives, the maximum concentration of bovine serum albumin (BSA) in conventional digital microfluidics is, for example, limited to only 0.005 mg $ml^{-1}$. Here, it is demonstrated that solutions of concentrated fluorescein isothiocyanate (FITC)-BSA (20 mg $ml^{-1}$) in 10 mM tris-HCl buffer can be easily manipulated on the photopyroelectric microfluidics platform (FIG. 8D). The confocal image of the liquid trail (after three cycles of transportation) on the platform probes no detectable protein residue, confirming the practical utility and validity of the platform in biological/chemical processing. The fabrication of such a versatile platform is beautifully simple without any need for microfabrication or electrodes.

Using our photopyroelectric microfluidics platform, the loss-free detection of an amino acid is demonstrated, which involves manipulation of biomolecules (glycine) and low-surface tension liquids (ethanol solutions). As shown in FIG. 8E, a small portion of the probing solution (2% ninhydrin in ethanol) is first dispensed from its reservoir droplet. Then, the analyte droplet (10% glycine in water) is navigated toward the probing one, inducing coalescence and triggering colorimetric reaction. The merged droplet gradually turns purple, confirming the existence of amino acid. Thus, the platform can accommodate liquids spanning a wide spectrum of surface tensions, showing its great potential in analytical chemistries, medical diagnosis, and biomedical assays.

A unique wavy dielectrophoretic force field is induced in response to the light stimuli by a three-layer surface and enables a full landscape of fluidic manipulations in a well-controlled, loss-free manner: moving, merging, dispensing, and splitting. This force field can be readily modified by superimposing multiple light irradiations for a much richer fluidic operation and droplet patterning. Together with its universality over a wide range of fluid types and volumes, the technique works as a precision wetting-proof liquid tweezer to maneuver fluids on demand, thus being of considerable significance both for biological/chemical fluidic processing where buffers, organic liquids, and even corrosive fluids participate in multistep and repeated reactions, and for fluidic engineering and manufacturing where precision patterning, printing, and building of multicompartment droplets are needed.

Unless otherwise indicated in the examples and elsewhere in the specification and claims, all parts and percentages are by weight, all temperatures are in degrees Centigrade, and pressure is at or near atmospheric pressure.

Chemicals 1H,1H,2H,2H-perfluorodecyltrichlorosilane (PFDTS) (97%) was purchased from Gelest. Tetraethyl orthosilicate (≥99%), cyclohexane (≥99%), 1,2-dichloroethane (≥99%), n-octanol (≥99%), acetic acid (≥99%), toluene (≥99.5%), n-decanol (99%), benzyl ether (99%), glycerol (≥99.5%), and FITC-BSA were purchased from Sigma-Aldrich. Tris (hydroxymethyl)aminomethane (>99.0%) was purchased from Tokyo Chemical Industry Corporation. Ammonium hydroxide (28 to 30% in water), hydrochloric acid (37% in water), and DCM (99.6%) were purchased from Acros. Ninhydrin (ACS reagent), glycine (99.5%), Nile red (97.5%), and N,N-dimethylformamide (99.9%) were purchased from J&K Scientific. Silicone oil (0.65 mPa·s) and Sylgard 184 silicone elastomer kit were purchased from Dow Corning. n-Heptane (99%), n-octane (>99%), n-decane (>99%), n-dodecane (>99%), n-hexadecane (98%), n-butanol (≥99.7%), ethyl acetate (99%), dimethyl carbonate (>98%), and ethylene glycol (>99%) were purchased from Aladdin Industrial Corporation. Dimethyl sulfoxide (>99.98%) was purchased from Thermo Fisher Scientific. Isopropyl alcohol (IPA) (≥99.8%) and acetone (≥99.5%) were purchased from RCI Labscan Limited. Ethanol (absolute) was purchased from VWR International. Deionized water was produced by a deionized water system (DINEC, Hong Kong).

Fabrication of Superomniphobic Surfaces

The superomniphobic surface was prepared by modifying a previously reported superamphiphobic surface based on candle soot. The glass slides (Deckglaser glass coverslips and Luoyang Tengjing Glass Co. Ltd.) were first coated with candle soot and then placed in a desiccator together with 1 ml of tetraethoxysilane and 1 ml of ammonia hydroxide. The desiccator was closed, and the vacuum was maintained for 18 hours. Then, the carbon soot core was removed by annealing at 550° C. for 3 hours in an oven. The annealed samples were treated with air plasma for 5 min using a plasma cleaner (Harrick, PDC-002-HP) at high power (45 W). Instead of 1H,1H,2H,2H-perfluorooctyltrichlorosilane (PFOTS) used in the literature, the samples were deposited with PFDTS (100 μl) in vacuum for 2 hours to decrease its surface energy. The samples were then super-repellent to ultralow-surface tension oils, such as silicone oil and n-heptane, but completely wetted by alcohols like ethanol, IPA, and n-butanol because of the strong interaction between alcohols and the unreacted silanol groups on PFDTS. To render the samples superomniphobic, they were then heated at 130° C. for 30 min to remove the unreacted PFDTS and promote film restructuring, followed by heat treatment at 310° C. for 15 min to promote condensation and lateral cross-linking of silanol groups.

Fabrication of Photothermal Film

Graphene nanoplatelets (6 to 8 nm thick and 5 μm wide; J&K Scientific) were first dispersed in PDMS precursor containing 10 wt % curing agent (Sylgard 184 silicone elastomer kit, Dow Corning) by ultrasonic dispersion. The mixture was then spin coated onto a lithium niobate wafer (z-cut, 0.5 mm thick) at 1000 rpm for 20 s, followed by curing at 50° C. for 1 hour.

Contact Angle Measurement

The measurements of static contact angles, advancing and receding angles, were conducted using a contact angle measuring system (DataPhysics, OCA 25). Contact angle measurements were implemented by advancing and receding a small droplet of liquid (~5 μl) onto the surface using a 1-ml syringe (Hamilton) equipped with a 0.23-mm-outer diameter dosing needle. Fluorocoating agent SFCOAT (AGC Seimi Chemical) was used to render the needle surface to be omniphobic. The roll-off angles were measured by tilting a stage until the droplet (~5 μl) started to roll off the surface. Averages from at least three independent measurements are used. The surface tensions of the probe liquids were evaluated using a force tensiometer (DataPhysics, DCAT 25) by the Wilhelmy plate method.

Microscopy

The photothermal film and superomniphobic surface were imaged using a Hitachi S4800 scanning electron microscope. Energy-dispersive x-ray scattering was used to obtain the elemental mapping of various elements in photothermal film. The core-shell structure of the superomniphobic surface was observed using a transmission electron microscope (Philips, CM100). The roughness of superomniphobic surface was determined by a laser profilometer (Bruker, ContourGT-K1).

Liquid Residue Detection

The 10-μl probe liquid [Nile red (1 mg $ml^{-1}$) in silicone oil] was released to allow rolling or sliding on the tested surfaces (the superomniphobic surface, SLIPs, and PTFE) tilting at 5°. The droplets' traces were observed by fluorescence imaging using an inverted fluorescence microscope (Nikon Eclipse, TS100) equipped with a high-speed camera (Phantom, M110). The fluorescence of Nile red was excited by a 520-nm light source.

Droplet Continuous Manipulation

To continuously guide the droplet's motion, a 785-nm laser (Shanghai Laser & Optics Century, IRM785RMA-300FC) was fixed on a precise motion control platform (Aerotech, PlanarDL) to control the droplet's moving velocity.

Infrared Thermal Imaging

The light-triggered thermogenesis of the photothermal film was determined using an infrared thermal camera (Fluke, Ti40).

Transparency

The transparency of the superomniphobic surface was measured using a spectrophotometer (PerkinElmer, Lambda 35) in the 400- to 800-nm range at a scanning rate of 10 nm $s^{-1}$.

High-Speed Imaging

High-speed videos were obtained using a Phantom M110 camera.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A device for moving a liquid in a substantially loss-free operation, comprising:
- a tri-layered substrate, further comprising:
  - a photothermal film;
  - a pyroelectric crystal located on an upper surface of the photothermal film; and
  - a superomniphobic surface located on an upper surface of the pyroelectric crystal,
- wherein the device is configured to move the liquid over the superomniphobic surface in the substantially loss-free operation with a beam of light.

2. The device according to claim 1, wherein the superomniphobic surface comprises a silica nanosphere network.

3. The device according to claim 1, wherein the photothermal film comprises a graphene-polymer composite configured to sense beam of light and generate a localized and uneven thermogenesis.

4. The device according to claim 1, wherein the pyroelectric crystal comprises a lithium niobate wafer.

5. The device according to claim 1, wherein the beam of light comprises infrared light.

6. The device according to claim 1, wherein the liquid is an organic liquid, an inorganic liquid, or a biological substance.

7. The device according to claim 1, wherein the superomniphobic surface is configured to interface with the liquid in a substantially frictionless manner via maintaining a Cassie state and substantially prevent liquid residue thereon as a result of moving the liquid thereon.

8. A measurement instrument comprising the device according to claim 1.

9. A liquid transfer apparatus comprising the device according to claim 1.

10. An apparatus for moving a liquid in a substantially loss-free operation, comprising:
- a tri-layered substrate, further comprising:
  - a photothermal film base layer;
  - a pyroelectric crystal located on an upper surface of the photothermal film; and
  - a superomniphobic surface located on an upper surface of the pyroelectric crystal, the superomniphobic surface configured to interface with the liquid; and
- a light generation component configured to irradiate a beam of light onto the superomniphobic surface.

11. The apparatus according to claim 10, wherein the light generation component irradiates an infrared beam of light onto the superomniphobic surface.

12. The apparatus according to claim 10, further comprising:
- a movement component configured to at least one of:
  - move the light generation component relative to the superomniphobic surface to thereby move the liquid over the superomniphobic surface; or
  - move a structure including the superomniphobic surface relative to the light generation component to thereby move the liquid over the superomniphobic surface.

13. A method of transporting a liquid in a substantially loss-free manner, comprising:
- irradiating a beam of light onto an upper surface of a superomniphobic layer, wherein the superomniphobic layer is located on a pyroelectric crystal, and the pyroelectric crystal is further located on a photothermal film, whereby the liquid is present on the upper surface of the superomniphobic layer not in contact with the pyroelectric crystal.

14. The method according to claim 13, wherein transporting the liquid comprises at least one of moving the liquid, merging the liquid, dispensing the liquid, and splitting the liquid into at least two fractions.

15. The method according to claim 13, further comprising:

moving the beam of light relative to the upper surface of the superomniphobic layer to thereby move the liquid across the upper surface of the superomniphobic layer.

* * * * *